(12) United States Patent
Milic-Frayling et al.

(10) Patent No.: US 7,861,151 B2
(45) Date of Patent: Dec. 28, 2010

(54) WEB SITE STRUCTURE ANALYSIS

(75) Inventors: Natasa Milic-Frayling, Cambridge (GB); Eduarda Mendes Rodrigues, Vila Nova De Gaia (PT); Shashank Pandit, Pittsburg, PA (US)

(73) Assignee: Microsoft Corporation, Redmond, WA (US)

( * ) Notice: Subject to any disclaimer, the term of this patent is extended or adjusted under 35 U.S.C. 154(b) by 884 days.

(21) Appl. No.: 11/566,837

(22) Filed: Dec. 5, 2006

(65) Prior Publication Data

US 2008/0134015 A1    Jun. 5, 2008

(51) Int. Cl.
G06F 17/27 (2006.01)
(52) U.S. Cl. ..................... 715/205; 715/200
(58) Field of Classification Search .................. 715/205
See application file for complete search history.

(56) References Cited

U.S. PATENT DOCUMENTS

| | | | |
|---|---|---|---|
| 6,035,330 A | 3/2000 | Astiz et al. | |
| 6,070,176 A | 5/2000 | Downs et al. | |
| 6,144,962 A | 11/2000 | Weinberg et al. | |
| 6,237,006 B1 * | 5/2001 | Weinberg et al. | 707/103 R |
| 6,360,235 B1 | 3/2002 | Tilt et al. | |
| 6,369,819 B1 | 4/2002 | Pitkow et al. | |
| 6,509,898 B2 | 1/2003 | Chi et al. | |
| 6,647,381 B1 | 11/2003 | Li et al. | |
| 6,856,313 B2 | 2/2005 | Gossweiler, III et al. | |
| 7,080,073 B1 | 7/2006 | Jiang et al. | |
| 2002/0147805 A1 | 10/2002 | Leshem et al. | |
| 2003/0061515 A1 * | 3/2003 | Kindberg et al. | 713/201 |
| 2003/0149707 A1 * | 8/2003 | Helmbrecht et al. | 707/104.1 |
| 2005/0066269 A1 * | 3/2005 | Wang et al. | 715/513 |
| 2006/0095430 A1 | 5/2006 | Zeng et al. | |
| 2006/0123361 A1 | 6/2006 | Sorin et al. | |
| 2007/0185871 A1 * | 8/2007 | Canright et al. | 707/7 |
| 2008/0091672 A1 | 4/2008 | Gloor | |

OTHER PUBLICATIONS

"About the Open Directory Project", available at least as early as Jan. 29, 2007, at <<http://dmoz.org/about.html>>, Netscape Communications Corporation, 1998-2005, pp. 1-2.

An, et al., "Characterizing the Citation Graph as a Self-Organizing Networked Information Space", available at least as early as Nov. 8, 2006, at <<http://www.cs.toronto.edu/db/WebPage/files/yuan-i2cs2002.pdf>>, Springer-Verlag Berlin Heidelberg, 2002, pp. 1-11.

Bekkerman, et al., "Disambiguating Web Appearances of People in a Social Network", available at least as early as Nov. 8, 2006, at <<http://www2005.org/cdrom/docs/p463.pdf>>, ACM, 2005, pp. 463-470.

Cai, et al., "Block-level link analysis", available at least as early as Nov. 8, 2006, ACM, 2004, pp. 1-8.

(Continued)

*Primary Examiner*—Doug Hutton
*Assistant Examiner*—Tionna Smith
(74) *Attorney, Agent, or Firm*—Lee & Hayes, PLLC

(57) ABSTRACT

A graph representation of a web site is generated by identifying blocks of links on web pages. Each block of links is represented by a node in the graph representation and connections between the nodes provide information on the re-use of blocks between pages.

13 Claims, 13 Drawing Sheets

OTHER PUBLICATIONS

Davison, "Recognizing Nepotistic Links on the Web", available at least as early as Nov. 8, 2006, pp. 1-6.

Frayling, et al., "SmartView: Enhanced Document Viewer for Mobile Devices", available at least as early as Nov. 8, 2006, pp. 1-11.

Gandhi, et al., "Web Research Infrastructure Project", available at least as early as Nov. 8, 2006, at <<http://weblab.tc.cornell.edu/forums/files/WebResearchReport,pdf>>, pp. 1-36.

Raghavan, et al., "Representing Web graphs", available at least as early as Nov. 8, 2006, pp. 1-27.

Suel, et al., "Compressing the graph structure of the Web", available at least as early as Nov. 8, 2006, pp. 1-10.

"The PageRank citation ranking: bringing order to the Web", available at least as early as Nov. 8, 2006, pp. 1-17.

Tian, et al., "A Web Site Mining Algorithm Using the Multiscale Tree Representation Model", available at least as early as Nov. 8, 2006, at <<http://www.acm.org/sigs/sigkdd/kdd2003/workshops/webkdd03/wkdd03-paper9.pdf>>, ACM, 2003, pp. 83-92.

Yossef, et al., "Template detection via data mining and its applications", available at least as early as Nov 8, 2005, ACM, 2002, pp. 1-12.

PCT International Search Report dated May 26, 2008 from corresponding PCT Application No. PCT/US2007/086529, 4 pages.

* cited by examiner

WEB SITE STRUCTURE ANALYSIS

BACKGROUND

Web authoring involves generation of content, in the form of web pages, and interconnecting them with hyperlinks. These hyperlinks enable a user to navigate through the content and enable cross-referencing between many pages.

A typical representation of a web site is in the form of a graph 100, as shown in the simple example of FIG. 1, consisting of nodes 101 that represent pages and links 102 that correspond to hyperlinks between pages. Whilst the structure of a web site may be clear where there are a small number of pages and a small number of links, (as in FIG. 1), typically web sites may comprise thousands to hundreds of thousands of web pages and this results in a graph which is large, complex and does not provide a clear representation of the structure of the web site.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A graph representation of a web site is generated by identifying blocks of links on web pages. Each block of links is represented by a node in the graph representation and connections between the nodes provide information on the re-use of blocks between pages.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
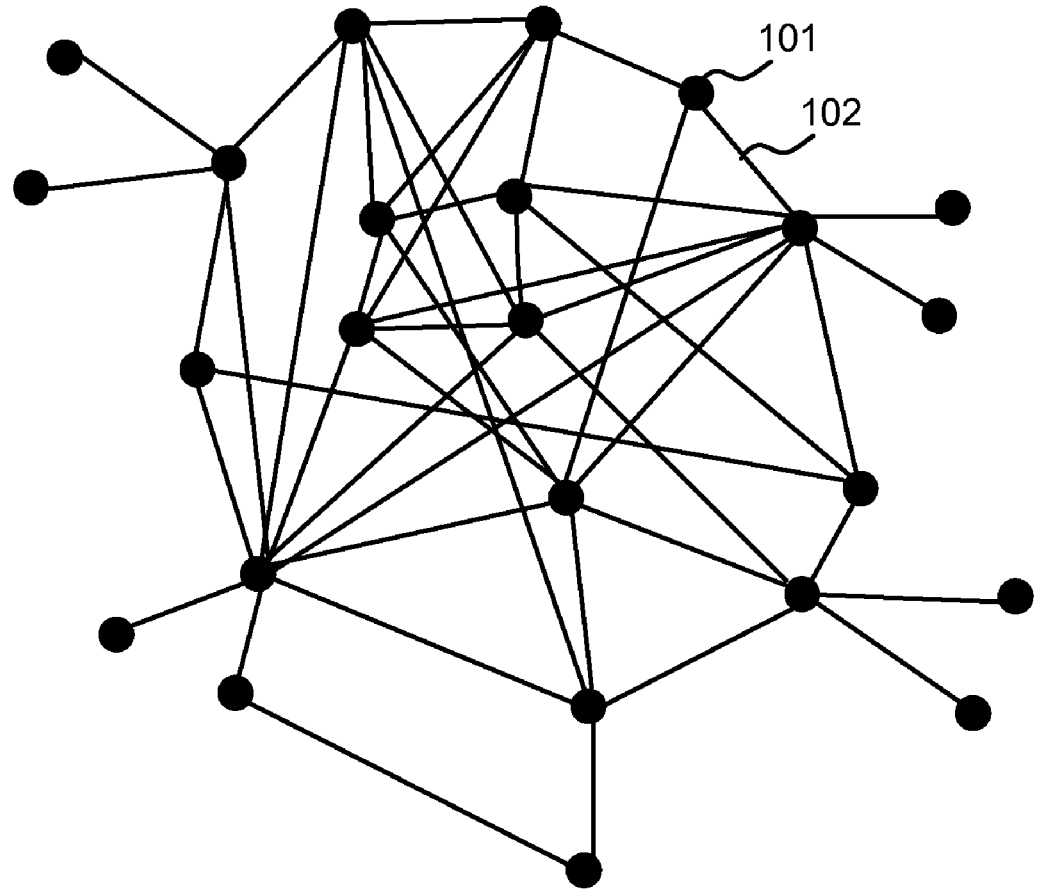
FIG. 1 shows a typical graph representation of a web site.

The standard web graph representation, as described above and shown in FIG. 1, is large, complex and often the full graph of pages and hyperlinks obscures any pattern in the site structure. This approach ignores the associations among the links that are encoded into the HTML representation of the page and that reflect the author's design of the site content structure. This representation also fails to capture topic association and functional groupings of links and their occurrence across pages in a web site.

Figure 2:
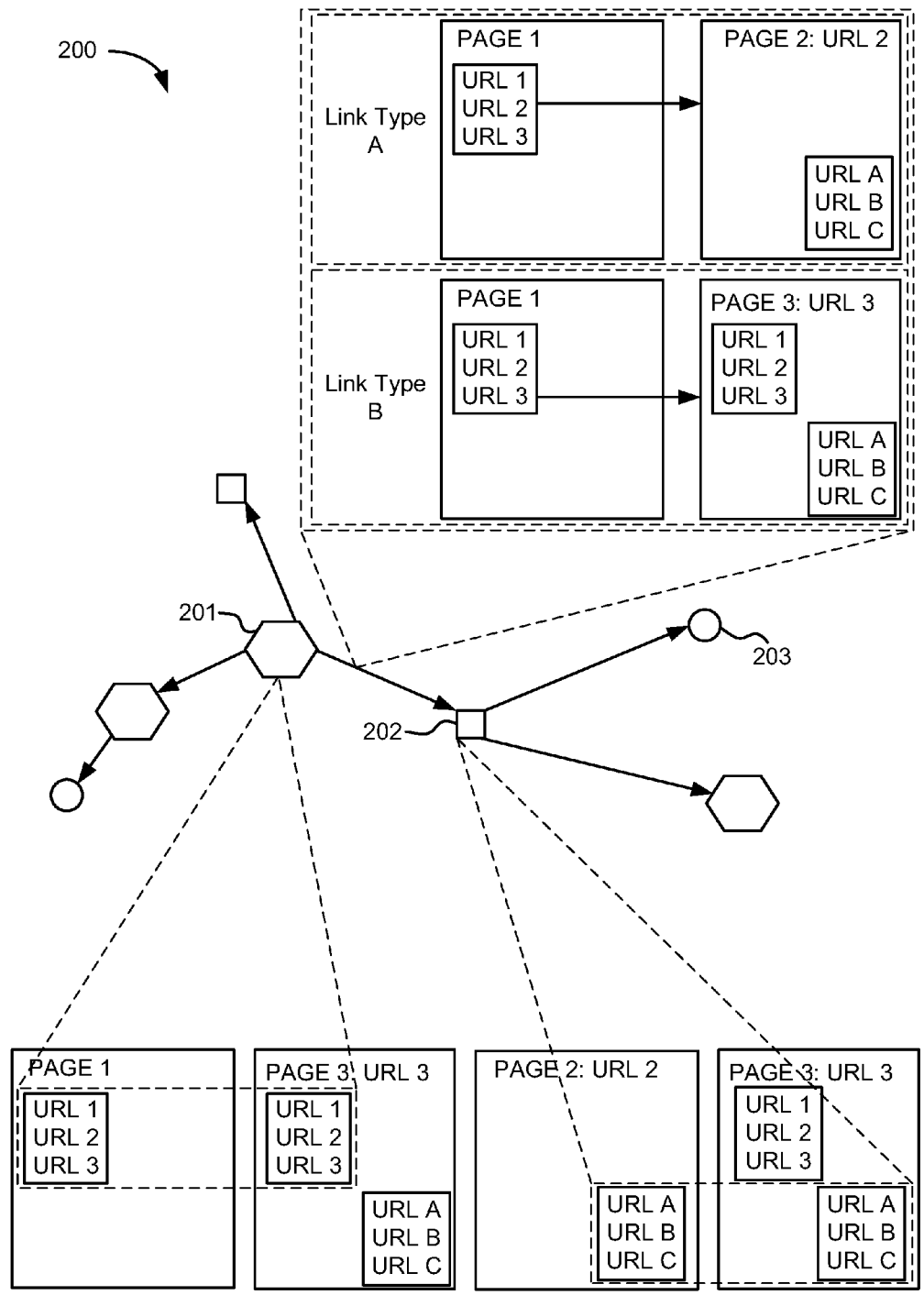
FIG. 2 shows a Link Structure Graph (LSG) representation of a web site.
Figure 3:
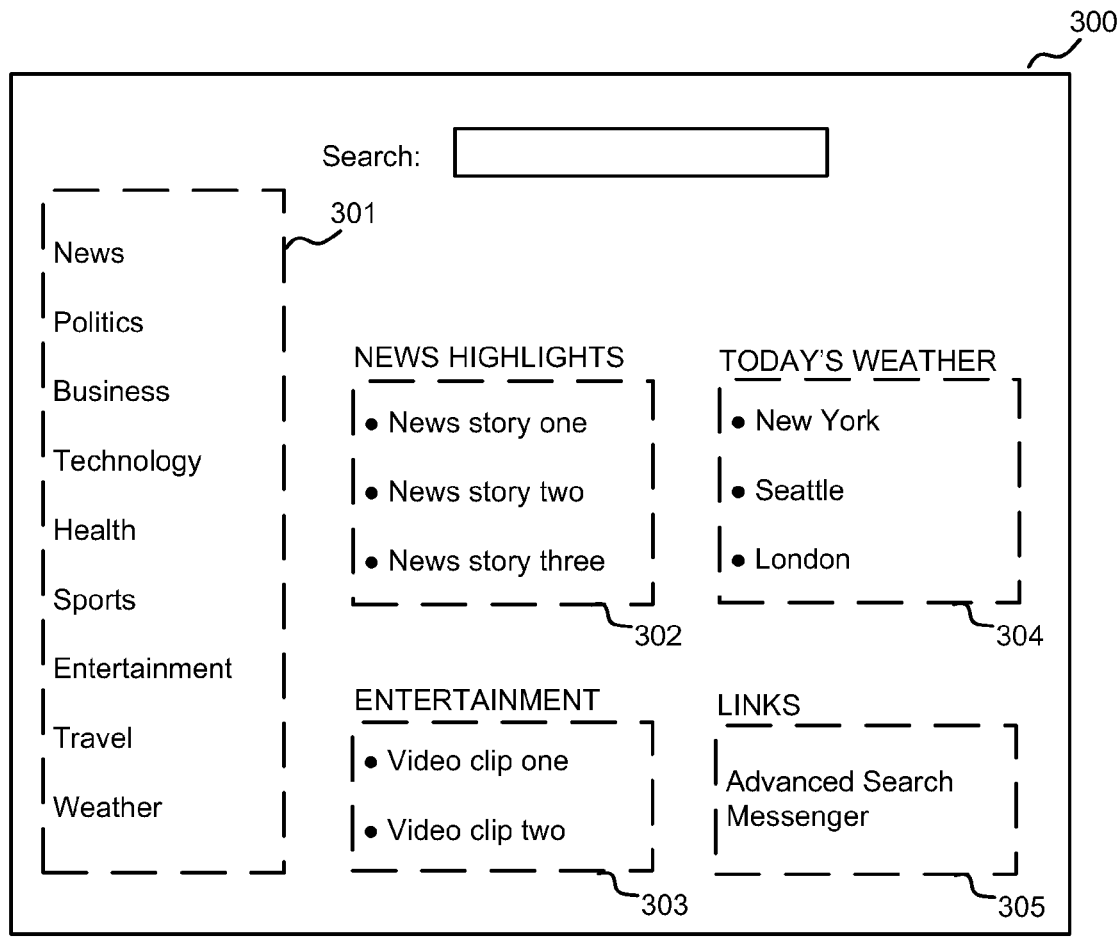
FIG. 3 shows a schematic representation of a web page.

FIG. 2 is an alternative representation 200 of a web site (or collection of web sites), referred to as a Link Structure Graph (LSG). The nodes (or vertices) 201-203 in the LSG 200 represent blocks of hyperlinks, referred to herein as 'link blocks' and the edges (or links between nodes, also referred to as connections) describe the reuse of the blocks between pages. FIG. 3 shows a schematic representation of a web page 300 which comprises five link blocks 301-305 shown by the dotted lines. These link blocks include the menu structure 301 on the left hand side of the web page and various groups of links 302-305 to related content. In the LSG shown in FIG. 2, there are three different types of nodes, represented by different shapes. The categorization of link blocks, algorithm for creation of the LSG and methods of LSG generation are described in more detail below. An LSG, as shown in FIG. 2, provides a compact representation of all the hyperlinks on the web site and enables analysis of the site organization. The representation also takes into account a user's perception and understanding of the pages and links.

Figure 4:
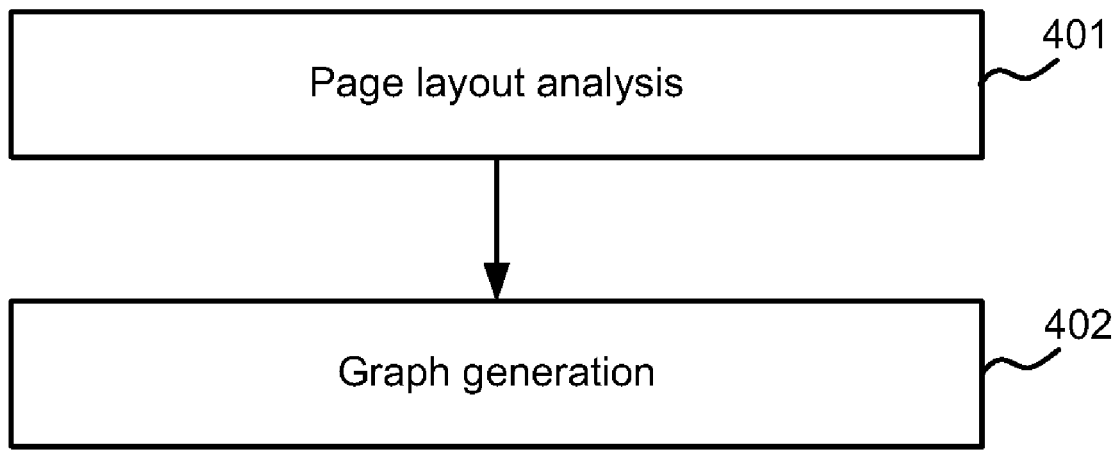
FIG. 4 shows a flow diagram of an example method of creating an LSG.

FIG. 4 shows a flow diagram of an example method of creating an LSG which involves first analyzing the layout of individual pages (step 401) in order to identify candidate link blocks. Following identification of candidate link blocks (in step 401), the graph is generated (step 402) by creating links among blocks to reflect the occurrence of blocks in web site pages. These two steps are described in more detail below. This method may provide:

Locality: The algorithm enables identification of both the global site structure and the local structure around individual pages.

Completeness: The algorithm captures and represents the complete hyperlink structure of the site. Examples of LSGs may represent both navigational structures and logical structures that are explicitly created by web authors to organize the content. For example, a shopping site author may choose to include a structural element called "best sellers" on a particular page, which links to a set of popular product pages. Although these links are referential in nature, their purpose is still to organize content into a logical structure.

Scalability: The algorithm runs efficiently for arbitrarily large web sites. Furthermore, by exploiting reusability of link blocks across pages graph structures may be obtained that are of order of magnitude smaller, in terms of the number of edges, than the traditional page-hyperlink representations of the web site structure.

Figure 5:
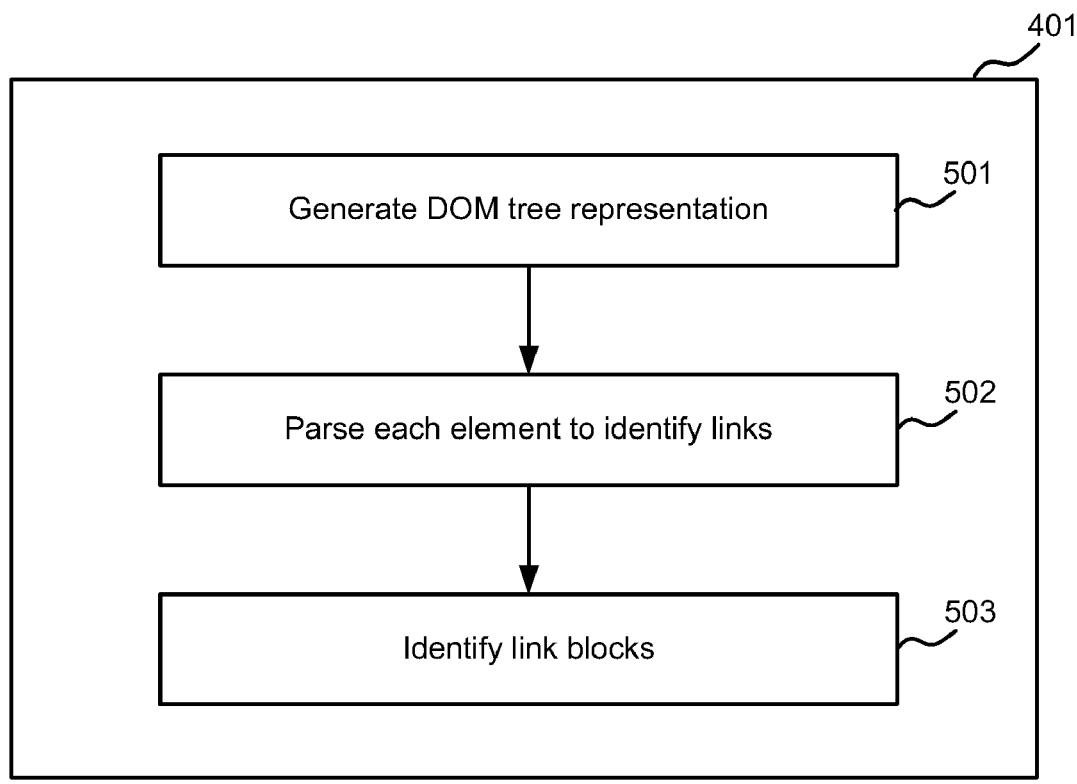
FIG. 5 shows the page layout analysis step of FIG. 4 in more detail.

FIG. 5 shows the page layout analysis (step 401) in more detail. The Document Object Model (DOM) tree representation of the HTML page is generated (step 501) and each element of the tree is parsed to identify links (step 502). These links may be links to other HTML pages or to any other type of content, such as PDF and PS files, documents (e.g. those created in Microsoft Word™), spreadsheets (e.g. those created in Microsoft Excel™) and presentations (e.g. those created in Microsoft PowerPoint™). A depth-first search strategy may be used in parsing each element of the tree. Link blocks are then identified (step 503) based on predetermined criteria. For example link blocks may be identified as contiguous hyperlink lists comprising more than x hyperlinks (for example where x=2) that share the same common ancestor on the DOM tree tag structure. URLs (uniform resource locators) may be extracted from the href attribute of the <a> or <area> tags and converted into canonical form. Text formatting tags, such as <font> or <b>, may not be considered for finding the common ancestor tag, as they do not impact on the layout of the links on the page. Depending on the criteria used, text may or may not be permitted between links within a block, or a limited amount of text may be permitted before the group of links is not considered to constitute a link block. In an example, the algorithm may allow for text elements containing non-alphanumeric characters to be located on the same DOM sub-tree that contains the block of links, i.e. white spaces and other characters used often to separate menu items, like '|', may be allowed to be between links in a list.

Every time a block is identified (in step 503) that has not been previously detected, it stores the block along with the associated DOM path and assigns a unique ID to the container page URL. This ID may be numeric in nature which enables more efficient computation than parsing and comparing URLs. In such an example {ID, URL} pairs may be stored in a hash table enabling quick lookup. The container page is the web page which contains the block of links. If a block is identified (in step 503) that has been previously detected, the set of container pages for that block (i.e. the list of pages containing that link, also referred to as the 'link block in-neighborhood') is updated with the new unique ID. This reduces the number of nodes in the overall graph by eliminating repetition. Where links to external web sites are identified, the container page may be added to the set of container pages (i.e. the in-neighborhood) of a global node (e.g. an i-node, as described later) that targets external pages. However, where the structure being analyzed is larger than a single web site, links to external web sites may not be collated in this way but instead may be treated in the same way as links to internal web sites.

In some examples, the only text that is preserved from each page in the parsing stage (step 502) may be the anchor text associated with each hyperlink, or in the case of image hyperlinks, the alt text, if present.

Figure 6:
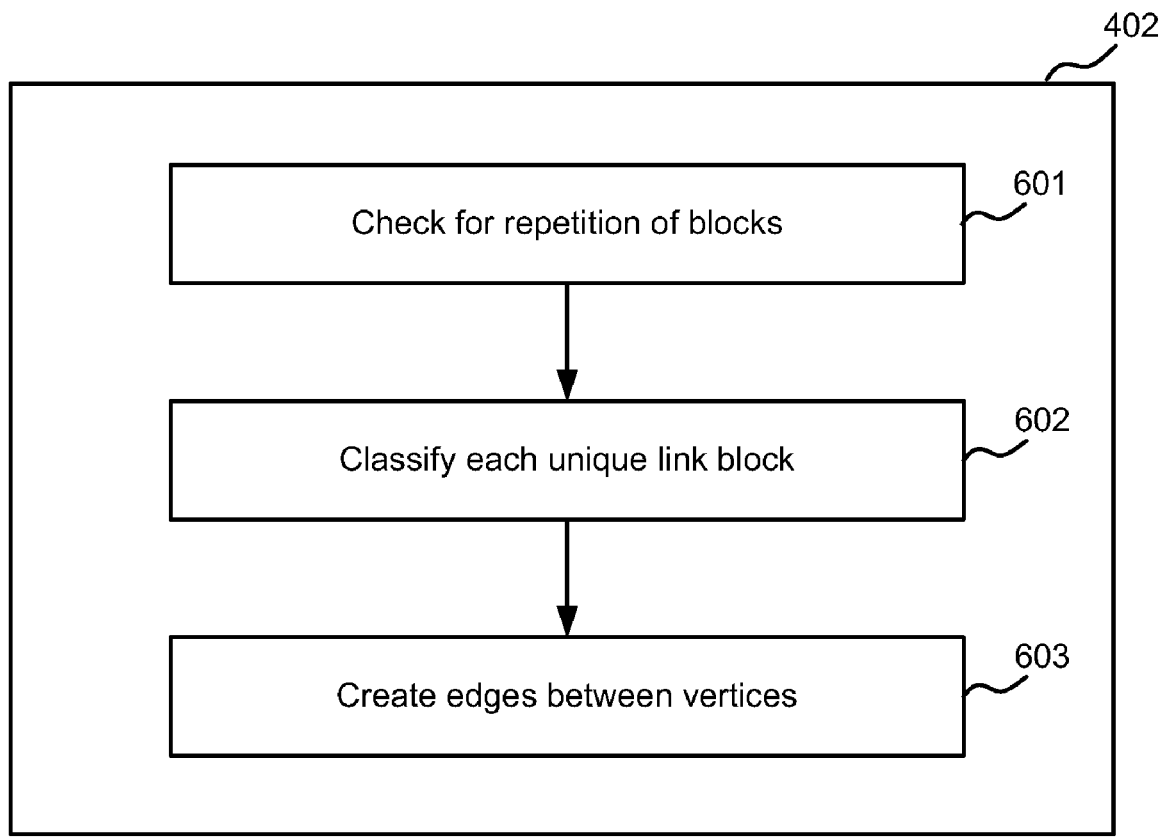
FIG. 6 shows the graph generation step of FIG. 4 in more detail.

FIG. 6 shows the graph generation step (step 402) in more detail. Although some repetition of blocks (e.g. identical blocks with an identical DOM path) may already have been eliminated (in step 503 and described above), the overall number of 'unique' blocks may be further reduced (step 601) by comparing the URLs in blocks. This process may also compare the DOM paths. The comparison process (in step 601) may use specified criteria to determine when link blocks with constituent URLs and/or DOM paths that are similar, rather than identical, can be merged. In an example, the checking for repetition may comprise:

Detection of the presence of identical blocks with different DOM paths or blocks that are slight variations of each other. For example, the same menu can be present in the top and the bottom section of a given page or there may be some slight differences in the HTML that impact on the extracted DOM paths. Such link blocks may be merged, as they represent the same structure element.

Detection of the presence of blocks with the same DOM path whose elements are subsets or supersets of other blocks. For example, menus that expand when one of the items is selected are identified as distinct structures. The block that contains both menu and sub-menu items is, in fact, the same block as the main menu plus a substructure and may be split in two.

This reduction in the overall number of blocks which are considered 'unique' provides simplification and more granularity of the LSG representation. Depending on the level of granularity required (which may depend upon the overall size of the web site or collection of web sites being represented), this step may be omitted or the criteria used in the comparison process may be changed.

In the above description, the page layout analysis (step 401) is achieved by parsing the DOM tree representation of the web page. In other examples, alternative methods may be used to perform this analysis, for example methods using identification of geometric properties of a page from the HTML page layout or methods using vision based segmentation (e.g. as described in the report by N. Milic-Frayling and R. Sommerer, entitled "SmartView: Enhanced document viewer for mobile devices," Microsoft Research Technical Report MSR-TR-2002-114, November 2002).

In comparing blocks (in step 601), the following two parameters may be used: the 'resemblance' and the 'containment' of link blocks. Block resemblance may be defined as the ratio of links the blocks have in common and may be defined in terms of sets of target pages $P_x$ for a given block x. The set of target pages (or link block out-neighborhood) is defined as the collection of all the pages pointed to by the link block (i.e. the pages having URLs that are in the link block). Given two link blocks, g and h that target a set of pages $P_g$ and $P_h$, respectively, their resemblance score $R_{gh}$ may be calculated as:

$$R_{gh} = \frac{|P_g \cap P_h|}{|P_g \cup P_h|}$$

If $R_{gh}=1$, (i.e. the blocks contain exactly the same links), the block with the smallest number of container pages (i.e. the smallest in-neighborhood), for example block h, is removed from the LSG representation, and the set of container pages (or in-neighborhood) of block g is adjusted accordingly, i.e. the set of container pages of g (denoted $Q_g$) is updated such that:

$$Q_g = Q_g \cup Q_h$$

This provides a reduction in the number of LSG nodes, whilst preserving the page connectivity information.

The containment of block g in block h, denoted as $C_{gh}$, may be characterized by the percentage of links in g that are common to both blocks g and h and may be calculated as:

$$C_{gh} = \frac{|P_g \cap P_h|}{|P_g|}$$

Correspondingly, the containment of block h in block g, denoted as $C_{hg}$, is characterized by the percentage of links in h that are common to both blocks g and h and may be calculated as:

$$C_{hg} = \frac{|P_g \cap P_h|}{|P_h|}$$

As mentioned above, in some examples blocks may be considered the same even if they are not identical so as to further simplify the LSG representation. This acknowledges that some types of navigation menus, either by design or inadvertently, are missing links. For example, in some menu systems, the main page may show all possible links (e.g. 'news', 'sport' and 'weather'). However on a sub-page, e.g. the news page, the active link may be omitted from the menu page (e.g. it may comprise 'sport' and 'weather' and may also include a 'home' link back to the main page). Thus the condition of total resemblance may be relaxed and the containment parameter (defined above) may be used in making this determination. For example, if both $C_{gh} > \tau$ and $C_{hg} > \tau$, where $\tau$ is some predefined threshold for the direct and inverse containment of g and h, both blocks may be considered to be the same link structure. In an implementation, in order for blocks to be considered sufficiently similar, at least 60% of the links of g may be required to be shared with h and vice-versa (i.e. $\tau = 0.6$). Where two blocks are considered sufficiently similar, the block with the smallest number of container pages (or in-neighborhood), say h, may be removed from the LSG, and the sets of container and target pages (or in- and out-neighborhoods) of remaining block g are adjusted accordingly, i.e. such that:

$$Q_g = Q_g \cup Q_h \text{ and } P_g = P_g \cup P_h$$

In addition to reducing the numbers of 'unique' blocks (in step 601), in some examples additional blocks (and therefore graph nodes) may be identified, as mentioned above. For example, where a menu expands when one of the items is selected to include a sub-menu for the selected item, the menu and the sub-menu may be identified as distinct structures and treated as separate blocks. If $C_{gh} = 1$ and $|P_g \cap Q_h| = 1$, i.e. h is a superset of g and there is only one target page of g that contains block h, this indicates that link block h is the expanded menu and block g is the main menu. Therefore the container set of pages of g may be updated to include the single container page of h, i.e. such that:

$$Q_g = Q_g \cap Q_h$$

Additionally block h is transformed into a smaller block which only represents the sub-menu and therefore the target pages from the main menu are removed from the set of target pages of h, (i.e. the target set of pages of h may be updated as $P_h = P_h \backslash P_g$).

This procedure, while maintaining the number of LSG nodes, enables the capture of more granular link structures. In such a situation, if the main menu has already been identified, the container set for the main menu may be incremented and a new block may be identified for the sub-menu. A link may subsequently be generated (in step 603) between the node representing the main menu link block and the node representing the sub-menu link block, dependent upon the linking criteria used.

Having reduced the overall number of link blocks being represented in the LSG, the remaining link blocks which are considered 'unique' may be classified (step 602). As described above and shown in FIG. 2, a link block may be classified as one of three different types of node: an s-node 201, a c-node 202 and an i-node 203. These three types of node may be defined based on the function of the link block:

Organizational and navigational link blocks: These are blocks of links typically repeated across pages with the same layout and underpinning the organization of the site (e.g. block 301 in FIG. 3). They are often lists of links uninterrupted by other content elements such as text. These blocks may be referred to as structural link blocks or s-nodes. An s-node therefore generally has more than one container page.

Content link blocks: These are blocks of links which are grouped by content association (e.g. they all relate to the same topic or sub-topic, for example blocks 302-304 in FIG. 3). These blocks are not likely to be repeated across pages but rather point to information resources. These blocks may be referred to as c-nodes. A c-node therefore often has only one container page.

Isolated links: Besides the link blocks, pages often contain links that are not part of a link group and may be only loosely related to each other, for example, by their location within the same paragraph of text. These links are referred to as i-nodes. All links on a page which are not considered s-nodes or c-nodes may be considered a single collection of links and denoted as a single i-node (e.g. links 305 in FIG. 3). Whilst it may be more efficient to represent all the isolated links by a single i-node, in other examples, the links may not necessarily be collated into a single i-node and may instead be represented as individual i-nodes or collated in groups, each represented by an i-node.

Figure 7:
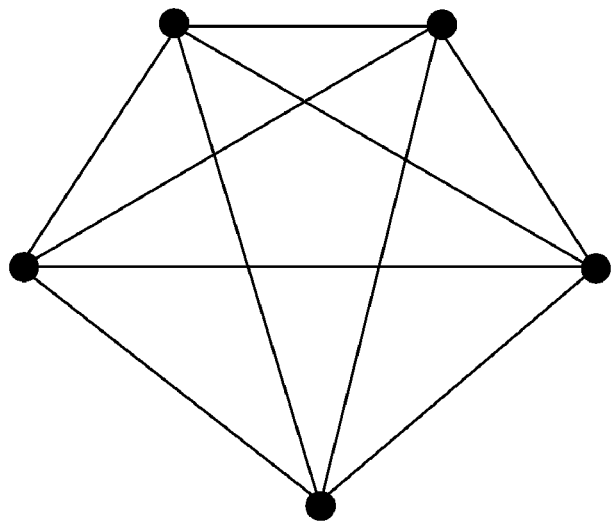
FIG. 7 shows a typical sub-graph element present on web site graphs.

A structural link block (or s-node) therefore comprises a set of links whose target pages contain the block itself. This can also be described in terms of the container pages, as the target pages of an s-node are a subset of the container pages for the block. In terms of the standard web page graph, the target pages P of the structural link block form a clique, i.e. a subset of vertices that are all connected to each other (as shown in FIG. 7). As described above, however, in some instances incomplete structural blocks may occur, for example when the link to the currently viewed page is disabled or dropped from the menu link set. In this case, the link blocks found within the target pages are not identical but have a high degree of overlap. These blocks may have been merged because they meet the specified criteria for merging (in step 601). In terms of the standard web page graph, such an incomplete structural block would also form a clique.

Whilst navigation menus may generally be categorized as s-nodes, navigation menus with hyperlinks to pages from a different host within the same domain may fall under the category of c-node.

Figure 8:
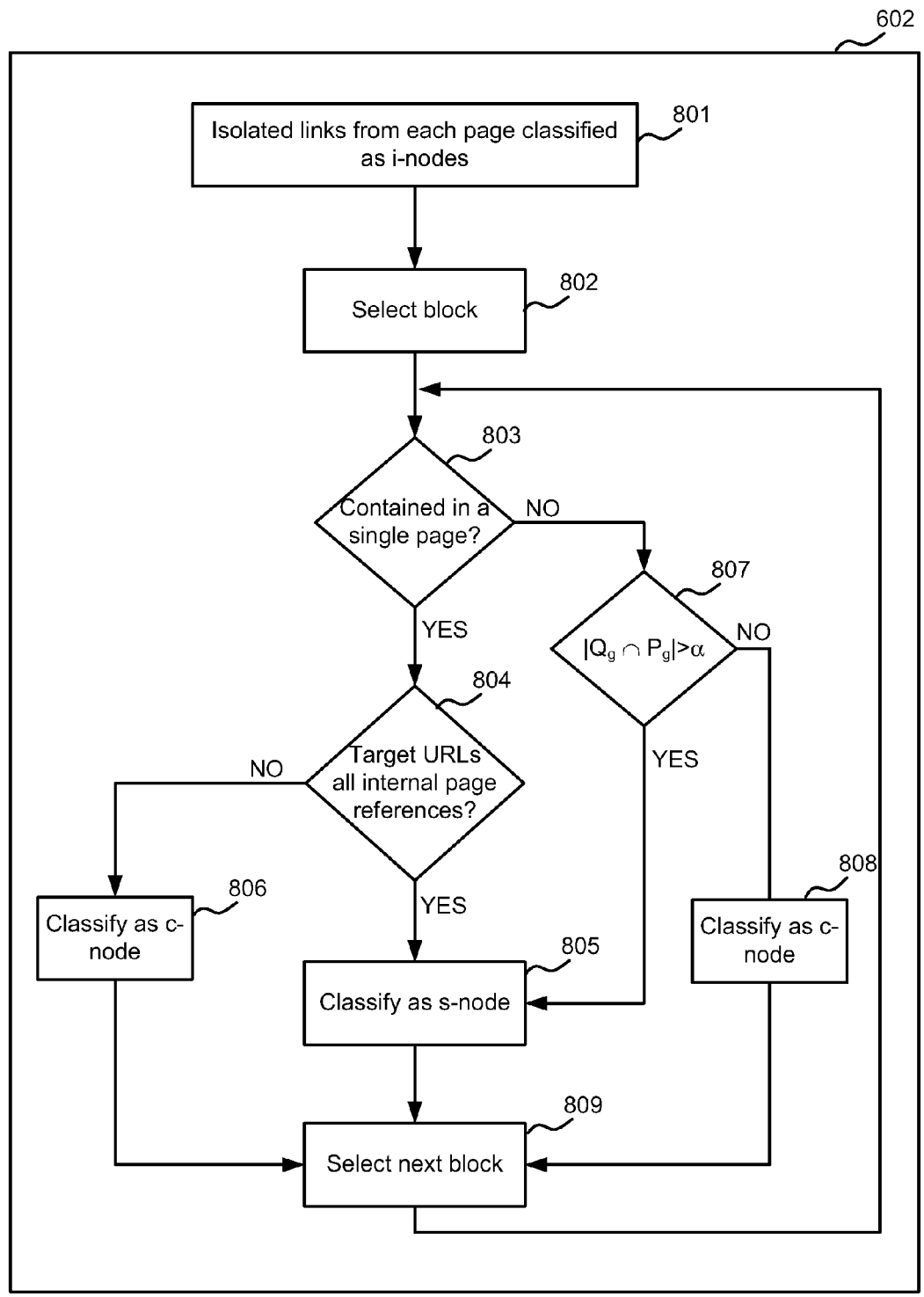
FIG. 8 shows the link block classification step of FIG. 6 in more detail.

The step of classifying each unique link block (step 603) as either s-nodes, c-nodes or i-nodes may be performed as shown in FIG. 8. The isolated links extracted from each of the pages (which may be extracted as a collection of isolated links), are classified as i-nodes (step 801). The reuse of the link block across its target pages may be used to distinguish between s-nodes and c-nodes. A block is selected (step 802) and if that selected block, referred to here as block g, is only contained in a single page (determined in step 803), and all the target URLs are internal page references (determined in step 804), the block is classified as a s-node (step 805). Internal page references refer to links which link to another part of the same page, (e.g. to a paragraph of text lower down the page). If, however, the block is only contained in a single page and all the target URLs are not internal page references (determined in step 804), the blocks is classified as a c-node (step 806). If the selected block is contained in multiple pages (as determined in step 803), the overlap between container and target pages ($Q_g$ and $P_g$ respectively) of the selected link block is analyzed and if the overlap is above a certain threshold, $|Q_g \cap P_g| > \alpha$ (determined in step 807), the link block is classified as a s-node (step 805). The parameter $\alpha$ may be the same as or different to $\tau$ (described above) and a value of $\alpha = 0.6$ may be used. If this threshold ($\alpha$) is not exceeded (as determined in step 807), the block is classified as a c-node (step 808). The process is then repeated for all the other 'unique' link blocks by selecting the next block (step 809) and repeating the steps described above (steps 803-808).

The determination of the overlap of container and target pages of a block (in step 807) may alternatively be considered as checking if the block targets form a maximal clique of the standard (undirected) web site graph.

As described above and as shown in FIG. 2, the different types of nodes may be represented differently (e.g. different shape and/or color) in the LSG. Furthermore, an LSG may show only a subset of all the nodes (e.g. only s-nodes or only s-nodes and c-nodes).

It will be appreciated that the classification of link blocks described above provides an example classification method and alternative classification methods (or no classification) may be used in other examples.

Having reduced the overall number of link blocks being represented in the LSG (in step 601) and in some examples also having classified the remaining link blocks (in step 602), the links between vertices may be formed (step 603). These links represent the re-use of blocks between pages and may be generated based on different linkage criteria. Two examples of linkage (or linking) criteria are described below. Different linkage criteria may be selected based on the application(s) for which the LSG is to be used. For example, the first example given below may be applied if the LSG is to be used for cascading anchor text whilst the second example given below may be applied if the LSG is to be used for finding templates within a web site.

Figure 9:
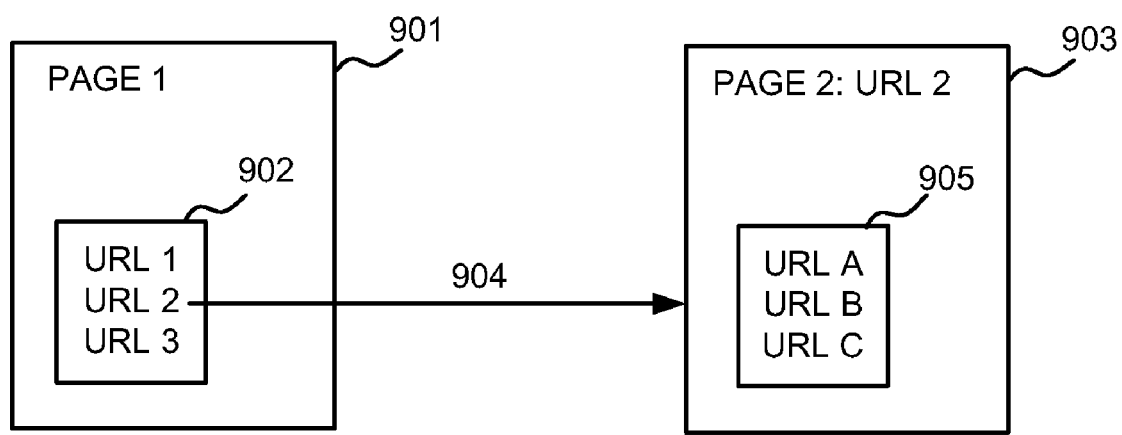
FIG. 9 shows a schematic diagram of the re-use of blocks between pages.
Figure 10:
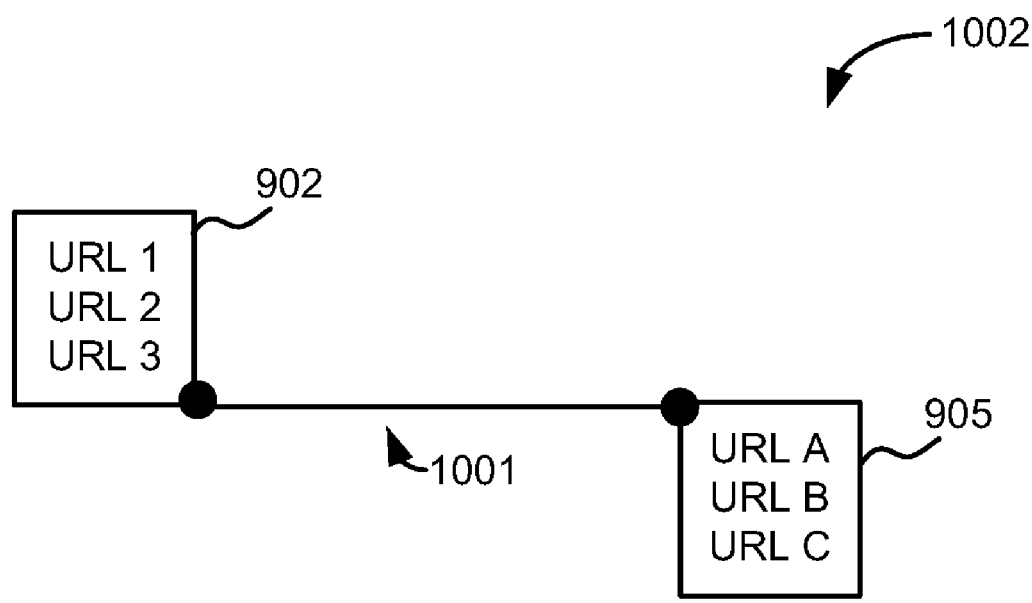
FIG. 10 shows an LSG.

In a first example, two blocks may be linked if by following one of the links in the first block, it is possible to arrive at a page containing the second block. Using the same notation as above, there is an edge between blocks g and h if:

$$|P_g \cap Q_h| > 0$$

i.e. at least one of the target pages of block g is a container page for block h. This is shown in FIG. 9, where a first page 901 contains a block of links 902. If one of the links within the block 902 points to a second page 903 (the link being represented by arrow 904) containing a second block of links 905, then there will be an edge 1001 between the two blocks 902, 905 in the LSG 1002, as shown in FIG. 10.

Figure 11:
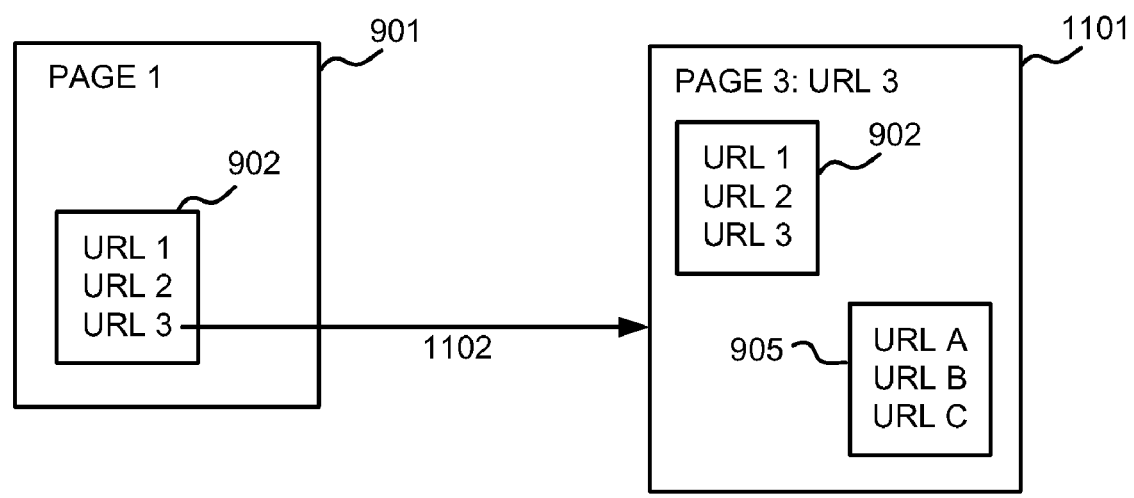
FIG. 11 shows a second schematic diagram of the re-use of blocks between pages.

In a second example, two blocks may be linked if by following one of the links in the first block, it is possible to arrive at a page containing both the first and the second block. Using the same notation as above, there is an edge between blocks g and h if:

$$|P_g \cap Q_g \cap Q_h| > 0$$

i.e. at least one of the target pages of block g is a container page for both blocks g and h. This is shown in FIG. 11, where a first page 901 contains a block of links 902. If one of the links within the block 902 points to a second page 1101 (the link being represented by arrow 1102) containing both the first block of links 902 and a second block of links 905, then there will be an edge 1001 between the two blocks 902, 905 in the LSG 1002, as shown in FIG. 10.

In the two examples given above, the edges (i.e. the connections between the nodes) of the LSG are directed. In other examples, any relationship between blocks may be used to establish links between them and the edges may be directed or undirected. In a further example, in order to capture the 'skeleton' structure of a web site, links may only be created which originate from s nodes. The links may alternatively be generated based on frequency of access where such information (e.g. Web usage logs) is available.

In some examples, weights may be attached to the links between blocks which may indicate the overall connectivity between target pages of the blocks. In an example, the weight of an edge between two LSG nodes g and h may be proportional to the total number of in-links to the overall set of target pages of the block $P_h$ originating from target pages of link block g, $P_g$. Therefore, the weight may be given by:

$$\text{Weight}_{g \to h} \propto |P_h| \cdot |P_g \cap Q_h|$$

The weight given by this formula to an edge between nodes g and h will not be the same in both directions and therefore such a formula may be suited to a directed LSG. In further examples, any other parameter may be used to generate the weights attached to links. The attribution of weights to the edges, for example as described above, may be used to preserve aggregated information about the individual connectivity between pages. This provides an LSG representation which can be seen as a dual representation of the standard Web graph. It is thus important to be able to map LSG analysis onto the other representation, and vice-versa.

The generation of an LSG, for example using the methods described above, may be achieved by crawling and/or on a community basis. In order to generate the LSG by crawling, a crawler may be seeded with a small percentage of pages from each web site. The use of the methods described above enables the LSG structure to be created incrementally as new pages are visited. In order to classify the link blocks as either s-nodes or c-nodes a crawler may do a 1-step breadth-first search (BFS) of the link blocks target pages (or out-neighborhoods) and check for the reusability of the blocks across the target pages. By visiting as little as 1% of the pages from a site, it may be possible to generate a relatively large part of the LSG (a much larger part of a graph than would be possible when generating a standard web page graph). This means that an LSG may be created where complete information about a web site is not available. Selective crawling may also be used by only crawling (in the BFS) those hyperlinks which are part of link blocks.

In another example, the LSG may be generated on a community basis by monitoring web pages visited by users. The LSG generation may be based solely on the pages visited by users or alternatively this may be coupled with selective crawling. In an example, the monitoring of users visits may be coupled with selective crawling which performs a 1-step BFS on web pages visited by users in order to be able to classify link blocks as s-nodes or c-nodes. As described above, the methods described herein enable the LSG structure to be created incrementally as more users visit a particular web site.

The methods described herein for LSG creation also do not depend upon the order in which pages are visited.

In another example, the LSG may be generated on a per-user basis i.e. as described above in relation to community generation but based only on the visits of a single user combined, in some examples, with selective crawling. In a further example, the complete LSG could be generated during search engine crawl and indexing and cached on the server for later use.

An LSG may be used, once generated, in many different applications, such as: segmentation of a web site and automatic tagging of web pages. The segmentation of a web site may be used to enable selective presentation of the web site structure for search and navigation and to assist in web site management and authoring. These example applications are described in more detail below.

Figure 12:
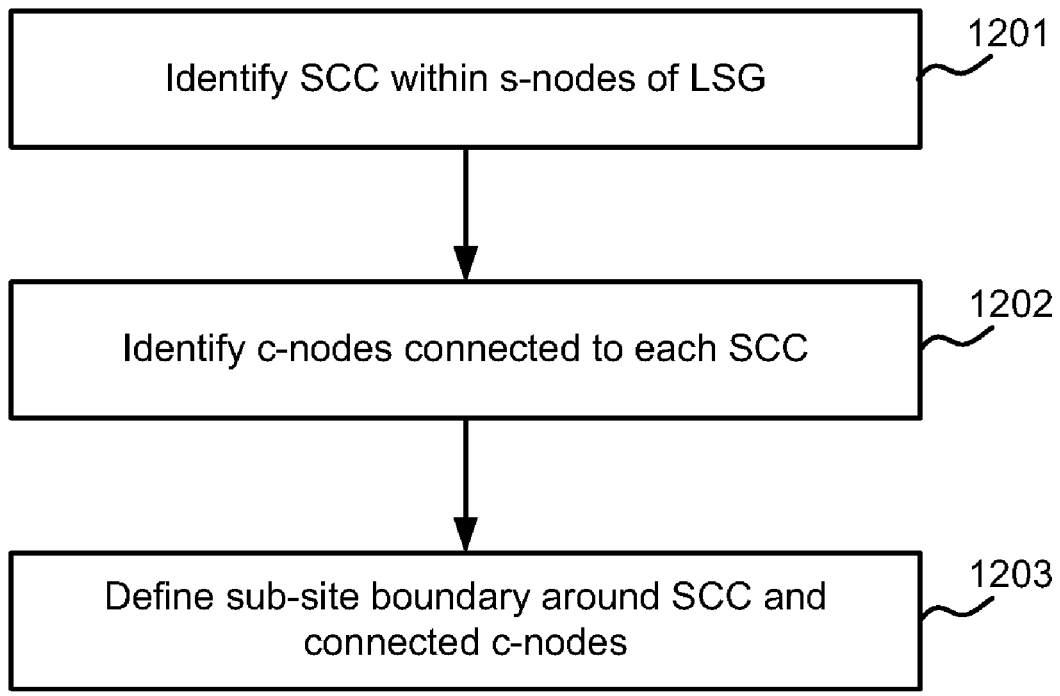
FIG. 12 shows a flow diagram of an example method of site segmentation.

Segmentation of a site may be performed using the LSG representation by analyzing the connectivity of s-nodes within a web site, as shown in the example flow diagram of FIG. 12. Considering only the s-nodes of an LSG representation, the strongly connected components (SCC) may be identified (step 1201). This identification may be made based on a directed graph or an undirected graph. The SCC of an LSG are defined as its maximal strongly connected sub-graphs, where a sub-graph is called strongly connected if, for every pair of vertices, a and b, within the sub-graph, there is a path from a to b and a path from b to a. In an example, given two link blocks g and h, if a target page of g contains h and a target page of h contains g, then g and h are part of the same SCC, for the directed case. On the undirected case, only one of the conditions would need to be true. Having identified any SCC (in step 1201), c-nodes connected to each SCC are identified (step 1202) and a sub-site boundary can then be defined around each SCC and its connected c-nodes (step 1203). In some examples i-nodes connected to each SCC may also be identified (in step 1202) and a sub-site boundary may be defined around each SCC and its connected c-nodes and i-nodes (in step 1203). Having segmented a site in this manner, each s-node would be part of a single sub-site whilst there may be situations where individual pages may be present in multiple sub-sites.

The segmentation information for a web site may be useful in many applications. In a first example, the sub-site information may be useful in providing orientation information to a user as part of a searching application or tool. For example, a user may be presented with the most appropriate sub-site that represents context for the retrieved page. Additional sub-sites may be indicated to the user that may be of interest based on the search and information on the important concepts covered by such regions may also be provided (this may use tagging information, as described in more detail below). This additional structure information and information about other parts of the web site may enable a user to browse around search results in the site, possibly accessing pages that are not directly linked to the pages offered by search engines. In a further example, where the LSG is generated on a per-user basis, a personalized view of the web site structure may be displayed to the user. This display may be useful in searching and/or navigating the web site. Where information on web usage is available, the most popular pages and the sub-sites containing them may be identified. These sub-sites containing the popular pages may be indicated on a LSG visualization which may be presented to the user.

In a second example, the sub-site information may be used in web site authoring and management tools to enable web administrators to monitor the navigation properties of the site and optimize the reusability of links and accessibility of web pages. For example, one can use the average distance between pairs of pages, the size of the maximum connected component, the ratio between s-node target pages and c-node target pages and similar statistics to characterize the site and correlate with the usage log data. This information can further be used to optimize usability of the site and accessibility of the pages in the site.

The sub-site information may also be used in the automatic tagging of web pages. Each link to a web page comprises the URL and the name or anchor text associated with the link. This anchor text may be generated by the author of the web page and may be used in indexing and searching web pages. As there is a hierarchy of links within a web site, which is represented in the LSG, the anchor text for parent links may, in many cases, be relevant to child links and this may provide additional information which may lead to improved searching and indexing capabilities. For example, given a menu system (as shown in block 301 of FIG. 3):

News
    Politics
    Business
    Etc

And a sub-menu under 'News' of:
    News story 1
    News story 2
    News story 3

It may be appropriate to cascade the anchor text from the parent link 'News' to all the child links in the sub-menu, such that each link in the sub-menu is tagged with its own anchor text and the anchor text for the parent link 'News'. However, in cascading down links from ever higher in the hierarchy of links, a point will be reached where the anchor text is no longer relevant to the child links (e.g. at a level above 'News'). Using the site segmentation information, obtained from the LSG representation, tags may be automatically cascaded down to links within a particular sub-site but not from outside the sub-site. This stops potentially irrelevant tags from being attached to links which would result in poor search results whilst enabling additional tag information to be used (rather than just using a link's own anchor text or that of the link and its parent).

The sub-site information and the anchor text may also be used to create concept hierarchies which can be compared across sites. For example, if the author of a site about mobile phone accessories creates a web site structure that reflects the organization of products (phone chargers, phone auto chargers, phone covers, phone ring tones, headphones and microphones, etc), a hierarchy of concepts from link anchor text and grouping of links on the pages may be generated (e.g. using text-based classification algorithms). Other sites that present information about mobile phone accessories are likely to use similar terminology and even have similar concept hierarchy. This uniformity can enable clustering of sites based on the concepts reflected in the anchor text and organization of the pages.

In a further application, the sub-site information and the anchor text may be used to provide a new navigation tool for a web site. A list of selected keywords may be generated from the anchor tags for links within a web site and these may be presented in a dedicated area of a browser (e.g. a sidebar). When a user highlights or clicks on keywords, a sub-graph of the site organization which contains pages relating to the keyword or a form of site map based on the LSG representation may be displayed. This enables a user to browse or search through a web site based on concepts and thus complements standard browsing based on hyperlinks only.

Figure 13:
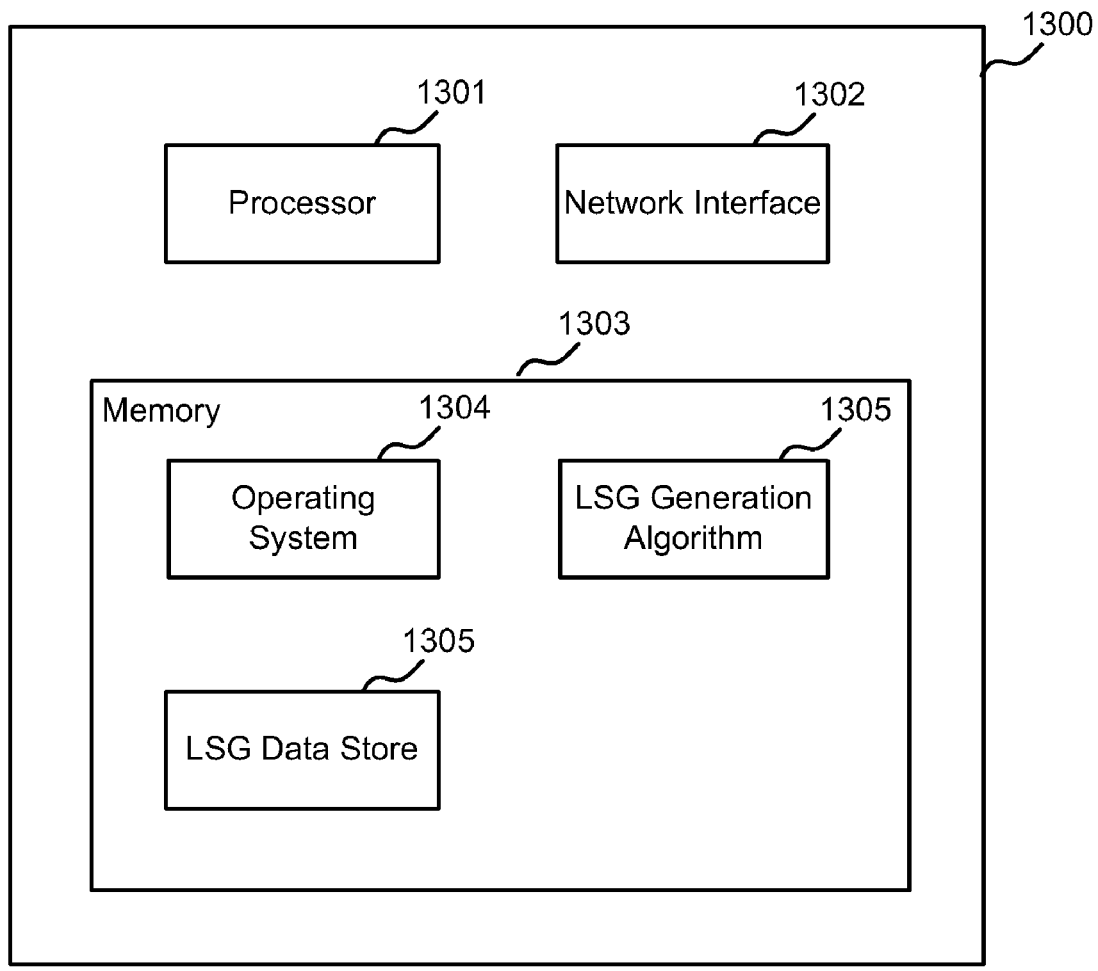
FIG. 13 shows a schematic diagram of a computing device suitable for implementation of the methods described herein.

FIG. 13 shows a schematic diagram of a computing device suitable for implementation of the methods described above. The device 1300 comprises a processor 1301 and a network interface 1302. The device further comprises memory 1303 which may comprise memory integrated within the device and/or removable computer readable media, or device-readable media. This memory is arranged to store executable instructions to cause the processor 1301 to perform one or more steps from the methods described above. The memory 1303 may comprise one or more of an operating system 1304, an LSG generation algorithm 1305 and an LSG data store 1306. The computing device 1300 may comprise a web server, other server, PC or other device. In another example, the crawling and the algorithm may run on a distributed computing architecture (computational Grid), which would make computation more efficient.

As described above, an LSG representation may be a compact representation of the complete hyperlink structure. The LSG may also provide an integrated representation of the fine level analysis of link associations, based on the HTML DOM structure, and the reuse of links across pages, as designed by the author. Additionally, an LSG may provide an ability to generate incrementally the main organizational and content elements of the LSG structure, (i.e. the s-nodes and c-nodes).

Whilst the examples described above relate to generating an LSG for a web site or group of web sites residing on the same host, this is by way of example only. The methods described are applicable to any sub-structure of the web. The distinction between external and internal links above is used only to scope the page collection to be described. Whilst in the examples above, the external links are used in the representation either as parts of the link blocks or a collection of external isolated links, the only difference in treatment is that external links are not examined further for reusability of link blocks. In other examples, there may be no difference in the treatment of internal and external links and/or a different boundary (instead of the host) may be used to define links considered to be internal and external.

Although the above examples refer to creation of an LSG for a web site or collection of web sites, the methods described are applicable to any collection of content where content elements (e.g. documents) are linked together. When applied in other contexts, the blocks of links would have different semantics, e.g. on a social network, connections between one person and several other people may be represented as a LSG 'block'. In such examples, the semantics of the LSG edges would also be different.

Although the present examples are described and illustrated herein as being implemented in an internet or network based system, the system described is provided as an example and not a limitation. As those skilled in the art will appreciate, the present examples are suitable for application in a variety of different types of computing systems and networks.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of analyzing the structure of a web site to create a representation of the web site, the method comprising:
   analyzing pages of the web site to identify candidate blocks of links;
   comparing the identified candidate blocks of links to determine whether any of the candidate blocks of links meet a similarity threshold;
   merging the candidate blocks of links that meet the similarity threshold into respective unique blocks of links and classifying each of the unique blocks of links;
   generating connections between pairs of the unique blocks of links based on a re-use of the unique blocks of links between pages related to each connected pair of unique blocks of links; and
   generating a graph representation of the web site comprising a plurality of nodes and a plurality of the generated connections between the nodes, wherein each node represents a unique block of links and each connection represents the re-use of the unique blocks of links between pages.

2. A method according to claim 1, wherein analyzing pages of the web site to identify candidate blocks of links comprises:

generating a document object model tree representation of the pages of the web site;
parsing each element of the tree to identify links; and
identifying candidate blocks of the links.

3. A method according to claim 1, wherein classifying each unique block of links is based on a function of the unique block of links.

4. A method according to claim 1, wherein classifying each of the unique block of links comprises:
classifying isolated links from each page as an i-node;
classifying unique blocks of links contained in a single page and comprising only internal links as s-nodes;
classifying unique blocks of links contained in a single page and not comprising only internal links as c-nodes;
classifying unique blocks of links contained in multiple pages and having an overlap between container and target pages exceeding the similarity threshold as s-nodes; and
classifying unique blocks of links contained in multiple pages and having an overlap between container and target pages not exceeding the similarity threshold as c-nodes.

5. A method according to claim 1, wherein generating connections between pairs of the unique blocks of links comprises:
for each pair of unique blocks of links, creating a connection between the pair of unique blocks of links if a target page of a first unique block of the pair is a container page for a second unique block of the pair.

6. A method according to claim 1, wherein generating connections between pairs of the unique blocks of links comprises:
for each pair of unique blocks of links, creating a connection between the pair of unique blocks of links if a target page of a first unique block of the pair is a container page for both unique blocks of the pair.

7. A method according to claim 1, further comprising:
for each generated connection, calculating a weight based on links that are common between the pairs of unique blocks of links.

8. A method according to claim 1, further comprising:
identifying sub-sites with the web site based on the graph representation.

9. A method according to claim 8, wherein identifying sub-sites with the web site based on the graph representation comprises:
identifying strongly connected components within the graph representation.

10. One or more computer readable storage media with computer executable instructions for performing acts comprising:
analyzing pages of a web site to identify candidate blocks of links;
comparing the identified candidate blocks of links to determine whether any of the candidate blocks of links meet a similarity threshold;
merging the candidate blocks of links that meet the similarity threshold into respective unique blocks of links and classifying each of the unique blocks of links;
generating connections between pairs of the unique blocks of links based on a re-use of the unique blocks of links between pages related to the connected pair of unique blocks of links; and
generating a graph representation of the web site comprising a plurality of nodes and a plurality of the generated connections between the nodes wherein each node represents a unique block of links and each connection represents the re-use of the unique blocks of links between pages.

11. One or more computer readable storage media according to claim 10, wherein analyzing pages of the web site to identify candidate blocks of links comprises:
generating a document object model tree representation of the pages of the web site;
parsing each element of the tree to identify links; and
identifying candidate blocks of the links.

12. One or more computer readable storage media according to claim 10, wherein generating the graph representation of the web site comprises generating nodes that correspond to the unique blocks of links and generating edges between two nodes that correspond to the generated connections between the pairs of unique blocks of links.

13. A device for displaying a representation of a web site, the device comprising:
a processor;
memory coupled to the processor; and
a link structure graph generation module stored in the memory and executable on the processor to:
analyze pages of the web site to identify candidate blocks of links;
compare the identified candidate blocks of links to determine whether any of the candidate blocks of links meet a similarity threshold;
merge the candidate blocks of links that meet the similarity threshold into respective unique blocks of links and classify each of the unique blocks of links;
generating connections between pairs of the unique blocks of links based on a re-use of the unique blocks of links between pages related to the connected pair of unique blocks of links; and
generating a graph representation of the web site comprising a plurality of nodes and a plurality of the generated connections between the nodes, wherein each node represents a unique block of links and each connection represents the re-use of the unique blocks of links between pages.

* * * * *

UNITED STATES PATENT AND TRADEMARK OFFICE
CERTIFICATE OF CORRECTION

| | |
|---|---|
| PATENT NO. | : 7,861,151 B2 |
| APPLICATION NO. | : 11/566837 |
| DATED | : December 28, 2010 |
| INVENTOR(S) | : Natasa Milic-Frayling et al. |

It is certified that error appears in the above-identified patent and that said Letters Patent is hereby corrected as shown below:

In column 14, line 13, in Claim 10, delete "nodes" and insert -- nodes, --, therefor.

Signed and Sealed this
Twenty-sixth Day of July, 2011

David J. Kappos
*Director of the United States Patent and Trademark Office*